March 14, 1967  F. J. RUSSELL ETAL  3,308,866
THREADED MEMBER ANTI-LOOSENING DEVICE
Filed June 7, 1965
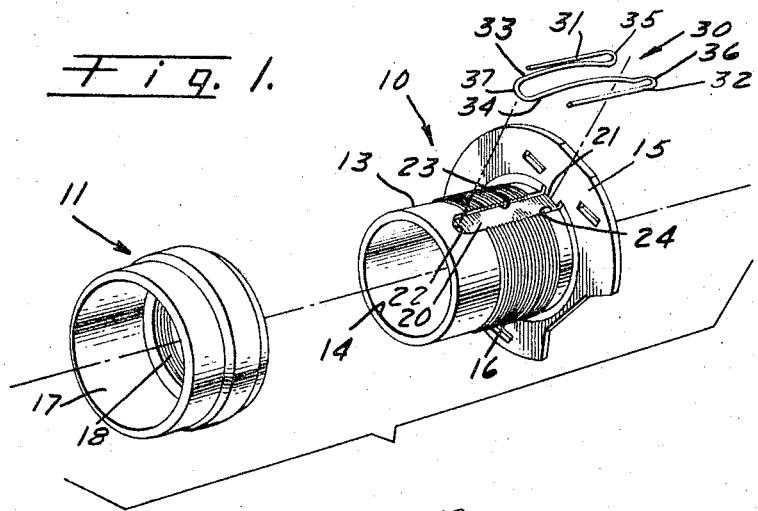
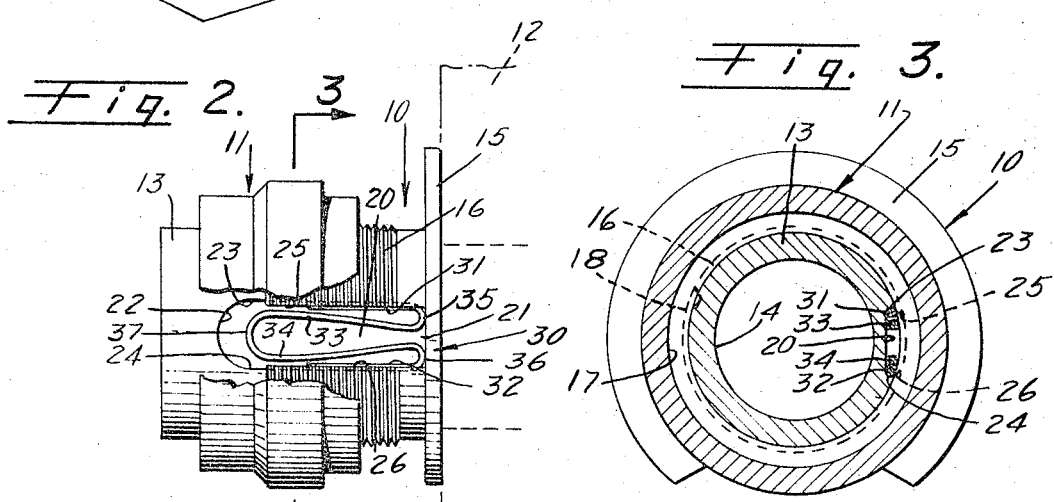
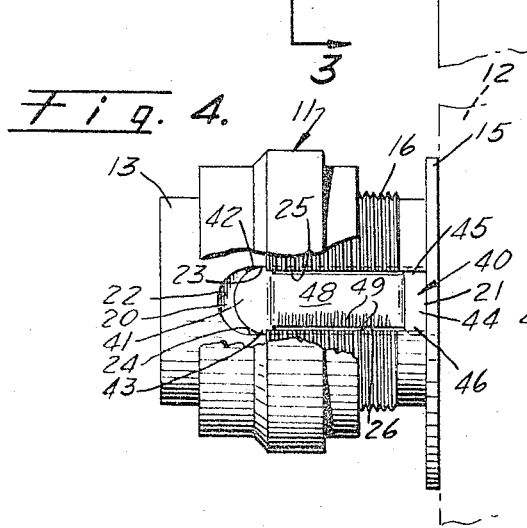
Fred J. Russell,
Richard L. Armstrong,
Harold W. Falk,
INVENTORS.
BY Beehler & Arant
Attorneys

United States Patent Office 3,308,866
Patented Mar. 14, 1967

3,308,866
THREADED MEMBER ANTI-LOOSENING DEVICE
Fred J. Russell, 8635 Otis St., South Gate, Calif. 90280, Richard L. Armstrong, Santa Fe Springs, and Harold W. Falk, Los Angeles, Calif.; said Armstrong and Falk assignors to said Russell
Filed June 7, 1965, Ser. No. 461,922
3 Claims. (Cl. 151—25)

The invention has reference to threaded members which require the provision of some means for preventing unscrewing of the threaded members once they have been engaged, but which permits such unscrewing when an appropriate amount of force is applied.

When heretofore there has been some need to prevent unscrewing of threaded members, the more common expedient has been to make use either of a lock washer or some type of lock nut. Where the threaded members are elements of a door lock, some of the more conventional locking arrangements are not acceptable. For door locks, the practice has been to provide a threaded engagement between the exterior portion of a relatively stationary sleeve-like element and the interior of a rose or escutcheon assembly in order to permit the rose or escutcheon assembly to be tightened against the surface of the door, irrespective of whether the lock might be used upon a relatively thin door or a relatively thick door. In devices of the kind made reference to, use has been made in the past of a resilient, friction creating device positioned in a recess in the exterior of the threaded element, the friction creating device having flexible fingers extending outwardly so as to engage the projecting edges of the threads of the internally threaded elements when the threaded elements are rotated into threaded engagement. The fingers exhibit a tendency to resist reverse rotation and deflection and accordingly provide a frictional resistance against unthreading of the parts.

In other areas of the art, the tendency has been to depend upon solid inserts, plugs, collars, and comparable elements, usually of some yieldable synthetic plastic material or, on occasions, fiber material received in a suitable aperture in one of the threaded members which is either cut or deformed by the threads in the other member when in engagement, thereby to resist to some extent the rotation of one member with respect to another.

On those prior art devices which have made use of an insert material in a transverse slot, the insert material has either been of plastic construction, or, if not of plastic construction, then the insert material has been anchored in some fashion detrimental to its continued effectiveness.

Although the disclosure of the present invention is directed primarily to threadedly engaging tubular or cylindrical sections such as are commonly encountered on door locks, the structure and principle involved is equally effective for more or less conventional threadedly engaging members, such as a nut and a bolt.

It is therefore an object of the invention to provide a new and improved anti-loosening device for threaded members which is constructed entirely of metallic materials, but which by reason of its construction is such as to avoid undue wear of the threads of the parts in threaded engagement and also to avoid undue wear on the anti-loosening element as well.

Another object of the invention is to provide a new and improved anti-loosening device which is resilient in character, rather than solid and which, moreover, is an all-metallic device, the device being so constructed that it can be deformed to a degree when the threaded parts are engaged and wherein, because of the resilient character of the metallic element, the element exerts a sufficient force on the threaded parts to inhibit inadvertent loosening.

Still another object of the invention is to provide a new and improved anti-loosening device for threaded parts which incorporates an auxiliary transverse metallic, resilient piece having the ability to yield to pressure of the threads of one of the parts without deforming the threads and which can be built to provide a greater or lesser degree of friction force to prevent inadvertent loosening, depending upon the needs of a particular installation.

Still another object of the invention is to provide a new and improved anti-loosening device for threaded parts which requires the furnishing of only one part in addition to the threaded parts, the association of parts being compact, easy to assemble, and of such character that the anti-loosening elements can be completely concealed during use.

With these and other objects in view, the invention consists in the construction, arrangement, and combination of the various parts of the device, whereby the objects contemplated are attained, as hereinafter set forth, pointed out in the appended claims, and illustrated in the accompanying drawings.

In the drawings:

FIGURE 1 is a perspective exploded view of the parts of the anti-loosening device.

FIGURE 2 is a side elevational view broken away, showing the parts of the anti-loosening device of FIGURE 1.

FIGURE 3 is a cross-sectional view on the line 3—3 of FIGURE 2.

FIGURE 4 is a side elevational view partially broken away, showing a second form of the anti-loosening device.

FIGURE 5 is a side perspective view of the resilient insert of the device shown in FIGURE 4.

In an embodiment of the invention chosen for the purpose of illustration, the anti-loosening device is shown in the form especially well adapted to door locks. A relatively stationary threaded member is indicated generally by the reference character 10 and an adjustable threaded member by the reference character 11. The stationary threaded member 10 is shown in a form adapted to be mounted upon a door section 12 by appropriate conventional means (not shown).

The stationary threaded member 10 consists of a cylindrical section 13 having a smooth walled, hollow interior 14, within, which ordinarily is mounted a substantially conventional spindle member (not shown). The cylindrical section 13 is shown mounted upon a mounting plate 15 which is normally adapted to engage the surface of the central lock mechanism 12 in the manner suggested in FIGURE 2. Exterior threads 16 extend throughout a portion of the exterior of the cylindrical section 13.

The adjustable threaded member 11 is in the form of a sleeve provided with a substantial cylindrical interior 17 and interior threads 18 extending for a portion of the length of the cylindrical interior 17.

In this form of the invention, a slot 20 is formed in the cylindrical section 13 striking transversely through the exterior threads 16, the slot 20 being provided with an open end 21 and a closed end 22. As shown especially in FIGURE 3, sides 23 and 24 of the slot 20 are undercut and provide overhanging edges 25 and 26, extending at least for a portion of the length of the slot 20. The depth of the slot 20 is somewhat in excess of the full height of the exterior threads 16, the bottom of the slot 20 being at a location radially inwardly or deeper than the root diameter of the exterior threads 16.

In the embodiment of the invention of FIGURES 1, 2, and 3, a spring metal insert 30 is constructed of preferably round spring wire bent in the form shown, providing two longitudinally extending outside sections 31 and 32 respectively, and two central sections 33 and 34, respectively. A loop 35 joins the outside section 31 with the central section 33, and a loop 36 joins the outside section 32 with the central section 34. A third loop 37 joins together opposite ends of the central sections 33 and 34. It will be noted that the distance between the outside sections 31 and 32 is greater than the distance between the overhanging edges 25 and 26, so that the respective outside sections 31 and 32 lie in the undercuts of the sides 23 and 24. It may be preferable initially to have the distance between the outside sections 31 and 32 greater than the distance between the bottoms of the undercuts of the sides 23 and 24, so that the outside sections 31 and 32 are spring-pressed inwardly when inserted and then expand to hold the insert 30 snugly in place. The insert 30, however, is operable as long as the outside sections 31 and 32 lie within the undercuts, even though they need not be compressed to fit snugly.

There is an outwardly extending longitudinal bow, visible to good advantage in the perspective view of FIGURE 1, located throughout the length of the central sections 33 and 34. The bow effect is sufficient so that normally the central sections 33 and 34 extend above the exterior threads 16 on the outer sides and so that the inner sides are bowed away from the bottom of the slot 20. Therefore, when the adjustable threaded member 11 is screwed into threaded engagement with the stationary threaded member 10, the internal threads 18 engage the central sections 33 and 34, thus pressing radially inwardly the central sections 33 and 34, especially at the peak of the bowed portion. The central sections 33 and 34, by reason of their inherent resiliency, will press frictionally against the internal threads 18 and thereby will tend to inhibit relative rotation between the adjustable threaded member 11 and the stationary threaded member 10. However, the frictional resistance will not be so great but what the members can be screwed together by the exercise of some force. Nevertheless, the frictional resistance will be sufficiently great as to prevent unscrewing, except by application of a sufficient unscrewing force.

In the form of device of FIGURES 4 and 5, the stationary threaded member 10 and adjustable threaded member 11 are constructed in precisely the same manner as has been described in connection with FIGURES 1, 2, and 3. For this form of device, however, there is provided an insert 40 of somewhat different form and construction. The insert 40 is a relatively thin strip having a thickness less than the depth of the slot 20, and wherein one end 41 has a curved configuration similar to the curve of the closed end 22 of the slot 20. Opposite edges 42 and 43 have a distance between them slightly greater than the distance between the overhanging edges 25 and 26, but slightly less than the distance between the undercut portions of the sides 23 and 24. An opposite end 44 has edges 45 and 46 likewise spaced a distance apart greater than the distance between the overhanging edges 25 and 26 but less than the undercut portions of the sides 23 and 24. A central section 48 is bowed longitudinally outwardly and interconnects the ends 41 and 44. The breadth of the central section 48 is made slightly less than the distance between the overhanging edges 25 and 26. The central section 48, by reason of the outward longitudinally bowed effect, is raised throughout at least the midportion of its length to a location above the root diameter of the exterior threads 16 and possibly above the tops of the exterior threads 16. In view of the fact that the thickness of the central section 48 is less than the depth of the slot 20, the lower or inside face of the central section 48 will be elevated above the bottom of the slot 20. In this form of device, the outwardly facing side of the central section 48 may be provided with a series of partial threads 49 corresponding in pitch and number of threads per inch to the exterior threads 16 and internal threads 18, the partial threads 49 extending only part way through the thickness of the central section 48.

When the insert 40 is extended into the slot 20, the insert 40 will be extended through the open end 21 and will be moved to a location where the end 41 of the insert 40 is spaced from the closed end 22 of the slot 20, as suggested in FIGURE 4. The length of the central section 48 is made such that when the end 41 is in the relative position shown, the tab 47 will be adjacent the open end 21 of the slot 20 and will coincide more or less with the front face of the mounting plate 15.

When the insert 40 is mounted as shown and the adjustable threaded member 11 is engaged with the stationary threaded member 10, the internal threads 18 will then begin to engage the outwardly bowed central portion of the central section 48. If the central section 48 is provided with the partial threads 49, as described, and these partial threads 49 do not immediately align themselves with the internal threads 18 as the internal threads 18 extend into engagement with the central section 48, the central section 48 will yield, being constructed of spring metal as described, and the insert 40, being freely slidable in the slot 20, can slide slightly in an endwise direction in one direction or the other until the partial threads 49 are in alignment. Irrespective of whether or not partial threads 49 may be present, the resilient pressure of the central section 48 against the internal threads 18 will exert a frictional retarding effect upon rotation of the internal threads 18 with respect to the exterior threads 16, without, however, blocking rotation entirely. Consequently, after the threaded members 10 and 11 have been drawn into threaded engagement by forceable rotation, they will not inadvertently disengage because of the resisting frictional force thus created. The threaded members 10 and 11, however, can be unthreaded by forceable rotation, one with respect to the other. Because of the yieldable character of both forms of insert, they are not marred or distorted by engagement thereof with the exterior or internal threads 16 and 18 and can be used repeatedly as an anti-loosening device. In either event, the insert 40 is a single element easily inserted into the slot 20, and the slot 20 can be formed by simple machining operation for insertion into a dovetail slot like slot 20 in either of the threaded members 10 or 11.

While the invention has herein been shown and described in what is conceived to be the most practical and preferred embodiment, it is recognized that departures may be made therefrom within the scope of the invention, which is not to be limited to the details disclosed herein, but is to be accorded the full scope of the claims, so as to embrace any and all equivalent devices.

Having described the invention, what is claimed as new in support of Letters Patent is:

1. An anti-loosening device for a threaded connection comprising a first threaded member having external threads thereon, a second threaded member having internal threads thereon adapted to engage said external threads, one of said threaded members having a longitudinal slot extending transversely of the threads, said slot having a depth greater than the depth of the threads, opposite sides of said slot being undercut for at least a portion of the length and forming overhanging edges, and a spring metal insert for said slot having a thickness less than the depth of the slot and having a breadth wider than the breadth of said slot between said overhanging edges, said spring metal insert having outer edge section of a width greater than the distance between said overhanging edges and being engaged in the undercut portions of the slot and having a longitudinally extending portion intermediate said outer edge sections, said longitudinally extending portion being narrower throughout its thickness than the minimum distance between said overhanging edges and having inner and outer faces bowed longitudinally outwardly to a location wherein the inner face is removed from the bottom of the slot and the outer face is, located outwardly of the root diameter of the threads of said one of said threaded members, said spring metal insert being adapted to be depressed by the other of said threaded members when said threaded members are in engagement, whereby to inhibit relative rotation therebetween.

2. An anti-loosening device according to claim 1 wherein the central section of the insert includes partial threads extending transversely across the outer face of the longitudinally extending portion of the insert, said last portion being adapted to be depressed by the other of said threaded members when said threaded members are in engagement and to shift longitudinally in the slot to an extent needed to align said partial threads with the threads of said threaded members, whereby to inhibit relative rotation therebetween.

3. An anti-loosening device for a threaded connection comprising a first threaded member having external threads thereon, a second threaded member having internal threads thereon adapted to engage said external threads, one of said threaded members having a slot extending transversely of the threads, said slot having a depth greater than the depth of the threads, opposite sides of said slot being undercut for at least a portion of the length and forming overhanging edges, and a spring metal insert for said slot having a breadth wider than the breadth of said slot between said overhanging edges, said spring metal insert comprising a one-piece wire member of round cross-section having longitudinally extending outside sections engaged in said undercut and a generally U-shaped longitudinally extending central section joined to said outside sections by U-shaped bends and located between said overhanging edges, said central section having a breadth less than that of said slot and being bowed longitudinally outwardly to a location outwardly of the root diameter of the threads of said one of said threaded members, said central section being adapted to be depressed by the other of said threaded members when said threaded members are in engagement, whereby to inhibit relative rotation therebetween.

References Cited by the Examiner

UNITED STATES PATENTS

| | | | |
|---|---|---|---|
| 546,173 | 9/1895 | Martin | 151—23 |
| 1,020,026 | 3/1912 | Clark | 151—23 |
| 1,394,778 | 10/1921 | Menchen et al. | 151—25 |
| 2,263,223 | 11/1941 | Protin | 151—25 |
| 2,855,970 | 10/1958 | Neuschotz | 151—23 |
| 3,139,134 | 6/1964 | Russell et al. | 151—25 |

CARL W. TOMLIN, *Primary Examiner.*

THOMAS F. CALLAGHAN, *Examiner.*

R. S. BRITTS, *Assistant Examiner.*